(12) United States Patent
Huber et al.

(10) Patent No.: US 7,180,605 B2
(45) Date of Patent: Feb. 20, 2007

(54) VIBRATION SENSOR UTILIZING A FEEDBACK STABILIZED FABRY-PEROT FILTER

(75) Inventors: Dan Huber, Los Angeles, CA (US); Paul Corredoura, Redwood City, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 183 days.

(21) Appl. No.: 10/952,091

(22) Filed: Sep. 28, 2004

(65) Prior Publication Data

US 2006/0066875 A1 Mar. 30, 2006

(51) Int. Cl.
*G01B 11/02* (2006.01)
*G01B 9/02* (2006.01)

(52) U.S. Cl. ...................... 356/519; 356/506
(58) Field of Classification Search ............... 356/480, 356/454, 506, 519, 505
See application file for complete search history.

(56) References Cited

U.S. PATENT DOCUMENTS

| 6,509,972 B2 * | 1/2003 | Korn ..................... 356/519 |
| 6,538,748 B1 * | 3/2003 | Tucker et al. ............ 356/519 |
| 2005/0179912 A1 * | 8/2005 | Van Brocklin et al. ..... 356/519 |

* cited by examiner

*Primary Examiner*—Gregory J. Toatley, Jr.
*Assistant Examiner*—Patrick Connolly

(57) ABSTRACT

A sensor and method for using the same is disclosed. The sensor includes an optical cavity defined by first and second mirrors that have a spacing therebetween that varies in response to a force applied to the sensor and to a control voltage. The sensor has a drive circuit that measures light leaving an output port that samples light in said cavity and applies the control voltage to the optical cavity such that the spacing between the mirrors remains at a predetermined value independent of the force, the control voltage determining an output signal that provides a measurement of the force applied to the optical cavity. In one embodiment, the first mirror is fixed to the second mirror by a spring mechanism that causes the first mirror to move away from the second mirror, and the control voltage causes the first mirror to move toward the second mirror.

17 Claims, 5 Drawing Sheets

VIBRATION SENSOR UTILIZING A FEEDBACK STABILIZED FABRY-PEROT FILTER

BACKGROUND OF THE INVENTION

Vibration sensors are utilized in a number of applications to measure acceleration and/or vibrational activity. For example, a device that senses the vibrations of a piece of machinery can be utilized to determine whether the machinery is operating properly. Such sensors are also utilized in geophysical applications and applications requiring accelerometers.

Sensors based on micromachined capacitors are known to the art. In such sensors, a capacitor having a moveable plate and a fixed plate is subjected to the vibration. The moveable plate is suspended over the fixed plate by springs. When subjected to a force, the moveable plate moves, thereby changing the distance between the two plates, and hence, the capacitance of the capacitor. The distance between the plates can be determined by measuring the capacitance of the capacitor formed by the two plates.

This type of sensor can be operated in two modes. In the first mode, the springs are essentially relaxed when the device is not being subjected to an acceleration and the distance between the plates is at some predetermined value. When the sensor is subjected to an acceleration, the moveable plate is subjected to a force that is proportional to the mass of the plate and the acceleration. The distance between the plates will either increase or decrease depending on the direction of the acceleration. The distance is constantly monitored by a measurement circuit that measures the capacitance of the capacitor formed by the plates. If the acceleration remains constant for a sufficient period of time, the plates will move to a new position in which the springs are either compressed or extended sufficiently to balance the force generated by the acceleration. The distance between the plates at this new equilibrium position can be used to provide a measure of the acceleration.

The frequency response and sensitivity of such systems depends on the spring constants of the springs that separate the moveable plate from the fixed plate. If the springs are stiff, a relatively large force will be required to provide a change in capacitance that can be measured over the noise floor of the detection circuitry, and hence, the sensitivity of the instrument is poor but large accelerations can be measured. If the springs are compliant, the plate will ring at the resonance frequency of the spring/plate system when the acceleration ceases. If the springs are compliant, small accelerations can be sensed but the maximum acceleration that can be sensed will be limited. If the springs are relatively strong, the maximum detectable acceleration will be larger but the minimum detectable acceleration will also be larger. In addition, once displaced, the plate will ring at the resonant frequency of the spring/plate system when the acceleration ceases, and hence, the device will have a "dead" time. Even in those cases in which the springs are chosen such that the system is critically damped to prevent ringing, the damping time constant places a limit on the maximum frequency response of the accelerometer The limitations imposed by the damping time constant can be substantially reduced if the device is operated in the second mode. In this mode, a bias potential is applied between the plates to maintain the plates at a predetermined separation independent of any acceleration to which the device is subjected. The bias potential applies a force to the plates that causes the plates to move closer together by an amount that is determined by the magnitude of the potential. The force is independent of the polarity of the potential; hence, even an AC signal will cause the plates to move closer together. In this mode, a servo loop maintains the capacitance of the capacitor formed by the plates at a predetermined value by altering the bias potential to compensate for changes in the forces on the moveable plate resulting from accelerations. The magnitude of the bias signal provides a measure of the acceleration to which the device is subjected. Since the accelerometer must be able to measure both accelerations and decelerations and since the bias potential can only apply a force in one direction, a DC bias potential must be applied to the plates to compress the springs such that the springs remain compressed to some degree even when the maximum acceleration or deceleration is encountered.

It should be noted that the distance between the plates remains essentially constant in this mode, even when the sensor is subjected to an acceleration. There is a small change in the separation when an acceleration occurs that is immediately corrected by the servo circuit. Since the plates do not move any substantial distance, the damping time constant problems discussed above are substantially reduced, and hence, relatively compliant springs can be utilized to obtain high sensitivity.

The sensitivity of the sensor also depends on the noise levels in the sensing circuit. The sensing circuits typically apply a signal across the capacitor to measure the capacitance. This signal also applies a force to the moveable plate; hence, the sensing circuitry must use signals that are small compared to the bias levels that are normally placed on the plates, or the sensing circuitry must be able to separate the contribution to the change in capacitance from the sense signal from the contribution from the acceleration. To provide low noise, the cost and complexity of the sensing circuit becomes a significant factor.

SUMMARY OF THE INVENTION

The present invention includes sensor having an optical cavity defined by first and second mirrors that have a spacing therebetween that varies in response to a force applied to the sensor and to a control voltage. The sensor has a drive circuit that measures light leaving an output port that samples light in said cavity and applies the control voltage to the optical cavity such that the spacing between the mirrors remains at a predetermined value independent of the force, the control voltage determining an output signal. In one embodiment, the first mirror is fixed to the second mirror by a spring mechanism that causes the first mirror to move away from the second mirror, and the control voltage causes the first mirror to move toward the second mirror. In one embodiment, the sensor includes a reference light source that generates a reference light signal of a first reference wavelength. The reference light source may be constructed from a laser or from a light source that generates in a predetermined band of wavelengths and a filter for filtering the light to provide light in a narrower band of wavelengths that includes the first reference wavelength. In one embodiment, the reference light signal is input to the optical cavity through an input port in the cavity. In one embodiment, the reference light signal includes light of a second reference wavelength and a third reference wavelength, and the drive circuit includes a detector that measures the relative intensities of light of the second and third reference wavelengths that leaves the output port. In one embodiment, the optical cavity includes an optical gain material that generates light of a wavelength equal to a resonant wavelength of the optical cavity. In one embodiment, the drive circuit measures a quantity related to the difference in wavelength between the reference light source and the light leaving the output port.

DETAILED DESCRIPTION OF THE PREFERRED EMBODIMENTS OF THE INVENTION

Figure 1:
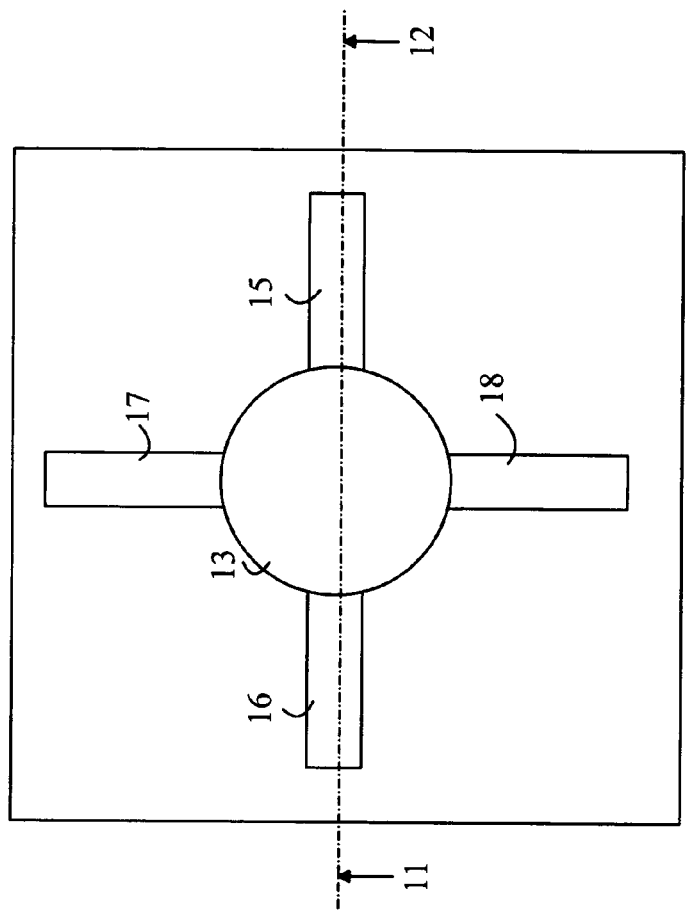
FIG. 1 is a top view of a Fabry-Perot based filter.
Figure 2:
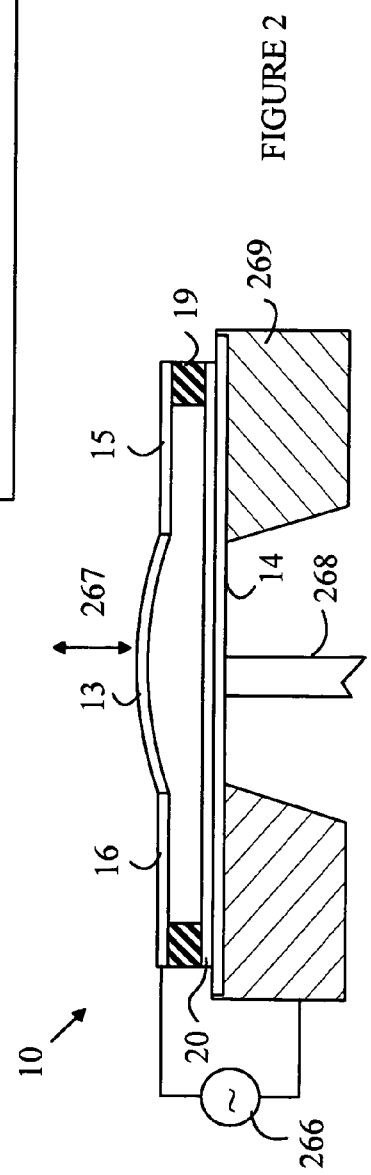
FIG. 2 is a cross-sectional view of the filter shown in FIG. 1 through line 11–12.

The present invention may be more easily understood with reference to FIGS. 1 and 2. FIG. 1 is a top view of a Fabry-Perot based filter. FIG. 2 is a cross-sectional view of the filter shown in FIG. 1 through line 11–12. A Fabry-Perot resonator cavity is formed between mirrors 13 and 14. Mirror 14 is flat and located on a semiconductor substrate 269. The mirror 13 is typically curved and is suspended from raised supports 19 by a number of micro-mechanical cantilevers shown at 15–18. The mirrors are preferably constructed from a number of layers of transparent material having indices of refraction that alternate from layer to layer. Such mirrors are well known to the art of semiconductor lasers, and hence, will not be discussed in detail here. To simplify the drawing, the layered structure of the mirrors has been omitted.

The application of a tuning voltage between the cantilevers and the substrate causes suspended mirror 13 to move towards mirror 14, thereby reducing the spacing between the two mirrors of the Fabry-Perot cavity. Since the resonant frequency of the cavity is determined by the distance between the mirrors, this reduction in spacing between the two mirrors causes the resonant optical frequency of the cavity to increase. The shift in the resonant frequency enables the device to be used directly as a tunable bandpass filter. If an optically-pumped or electrically-pumped optical gain medium 20 is placed in the cavity, the device becomes a tunable laser, with the lasing wavelength controlled by the resonant frequency of the Fabry-Perot cavity. Devices of this type are discussed in detail in co-pending U.S. patent application Ser. No. 09/550,548, which is hereby incorporated by reference.

When the Fabry-Perot cavity is used to construct a filter, the input light signal that is to be filtered can be input through one of the mirrors and the output light is taken from the other mirror. In practice, the mirrors used in the filters have a small transmission. When the input signal is off the resonance, a small amount of light enters the cavity and the remainder is reflected. When the filter is at resonance, the field within the cavity increases to the point at which the field cancels the reflected portion of the input signal, and hence, all of the light enters the cavity.

Light can be coupled to and from the filter directly or via an optical fiber such as fiber 268 shown in FIG. 2. Light that is coupled via the moveable mirror is preferably coupled directly using an appropriate optical system so that the coupling system does not restrict the motion of the mirror. In a device having a separate input and output port, either fiber 268 or mirror 13 can be the input port and the other would then be the output port.

In the case of an optically-pumped laser, the pumping light can be input through the same mirror used to output the laser light. In general, the pumping light will have a wavelength that is significantly different from that of the resonance wavelength of the cavity. Hence, a mirror that passes light of the pumping wavelength while reflecting light of the resonant wavelength can be used for both the input and output ports.

If the device shown in FIGS. 1 and 2 is subjected to an acceleration in the direction shown by arrow 267, a force will be applied to mirror 13, and the distance between mirrors 13 and 14 will be altered from that set by the current tuning voltage provided by drive circuit 266 and the springs that support the moveable mirror. Such accelerations can be caused by the gas molecules that surround the mirror and bombard the mirror. In the above-identified patent application, a feedback loop is used to adjust the tuning voltage to produce a change in the electrostatic force between the mirrors that cancels such forces, and hence, maintains the mirrors at some predetermined spacing independent of this noise source.

The present invention is based on the observation that the same mechanism can be utilized to compensate for the forces caused by acceleration of the device and that the tuning voltage signal is a measure of the acceleration to which the device is subjected. That is, the device can be used as an accelerometer.

Figure 3:
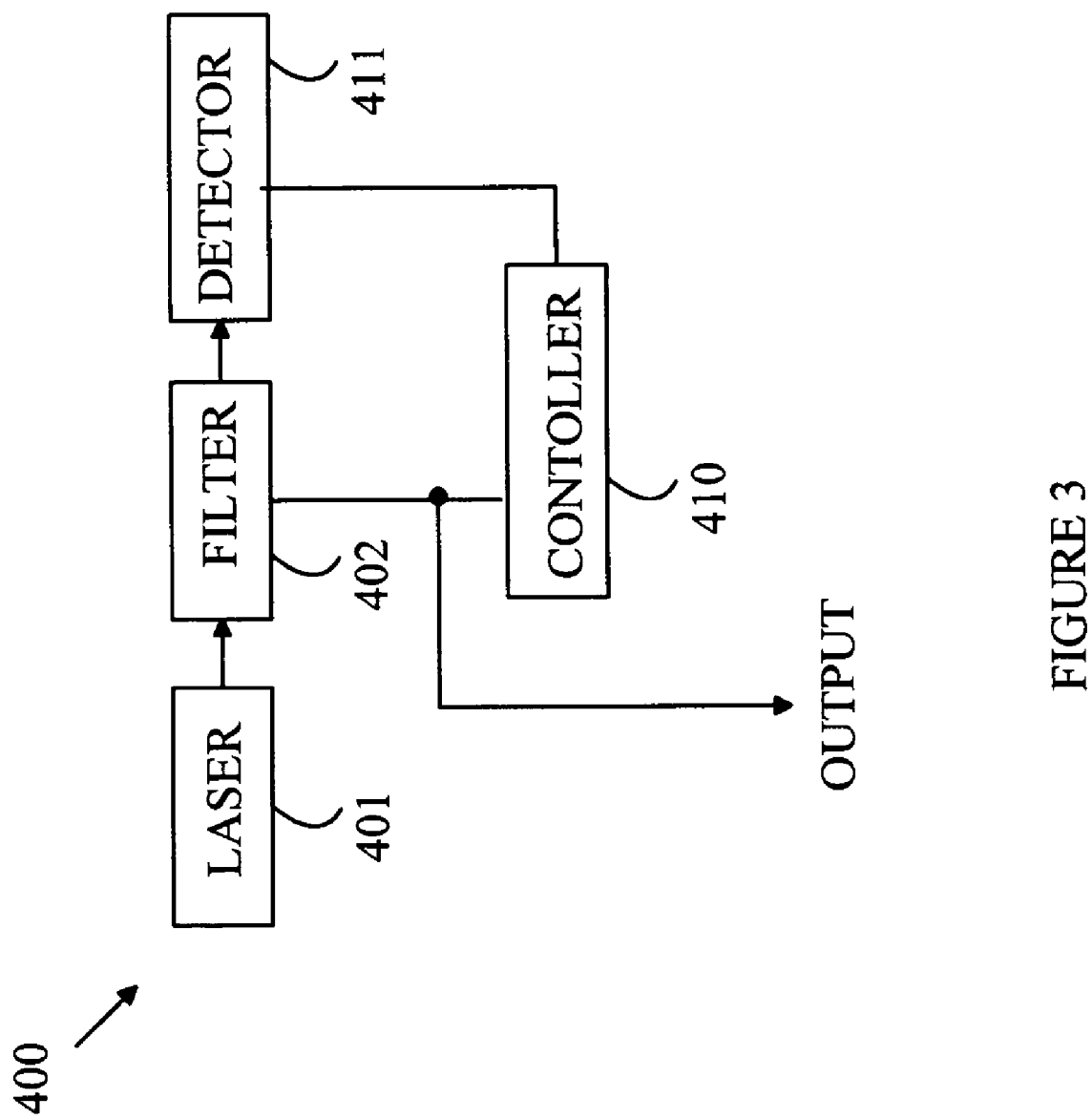
FIG. 3 illustrates a sensor according to one embodiment of the present invention.

Refer now to FIG. 3, which illustrates a sensor according to one embodiment of the present invention. Sensor 400 uses a laser 401 having an output wavelength to irradiate a Fabry-Perot filter 402 of the type discussed above. The spacing of the mirrors in Fabry-Perot filter 402 is set to provide a resonance wavelength of $\lambda_f$ where $n\lambda_{ref}=m\lambda_f$. Here, n and m are integers. The spacing of the mirrors is set by a control signal generated by controller 410. The amount of light leaving Fabry-Perot filter 402 is measured by optical detector 411, which may be constructed from a conventional photodiode. Controller 410 adjusts the control signal to maximize the signal generated by optical detector 411. The control signal, or a signal derived therefrom, also provides an output signal related to the acceleration.

The servo loop can be operated by dithering the control signal voltage or by dithering the laser frequency. In the embodiment shown in FIG. 3, the control signal voltage is dithered. Denote the current voltage level by S. Controller 410 measures the output of optical detector 411 for control voltages of S+dS and S−dS. If the output of the optical detector for these two control voltages is different, then the control voltage is increased or decreased by a predetermined amount that depends on which of the measured values was greater.

While a servo loop based on dithering the control signal voltage is the simplest to implement, such systems are less than ideal. First, the time needed for the mirror distance to settle after each test voltage limits the frequency response of the accelerometer. Second, the control signal now consists of a signal representing the forces applied to the mirror plus the dither signal, which is, in effect, a higher frequency noise signal that can interfere with the performance of the accelerometer.

These problems can be reduced by using a servo loop that operates by dithering the laser frequency and altering the control signal only when there has been a change in the mirror spacing. Assume that the laser reference signal and the filter pass function are both symmetric functions of the wavelength. When the mirror spacing matches the laser $\lambda_{ref}$, the light signal will have its maximum intensity. If the laser reference wavelength is increased by an amount $d\lambda_{ref}$, the measured intensity will go down by some predetermined amount. Similarly, if the laser reference wavelength is decreased by this amount, the intensity will decrease by the same amount. However, if the resonant wavelength of the cavity shifts slightly, the intensity measured by the detector at $\lambda_{ref}+d\lambda_{ref}$ will be different from the measured intensity at $\lambda_{ref}-d\lambda_{ref}$. The identity of the signal having the higher intensity determines whether the resonant cavity has shifted to longer or shorter wavelengths. When such an inequity is observed, the control signal that sets the mirror spacing is altered to bring the mirror spacing back to the proper value. Since the control signal is only altered when there is a shift in the mirror location, the noise problems and frequency response issues discussed above are substantially reduced.

Figures 4, 5:
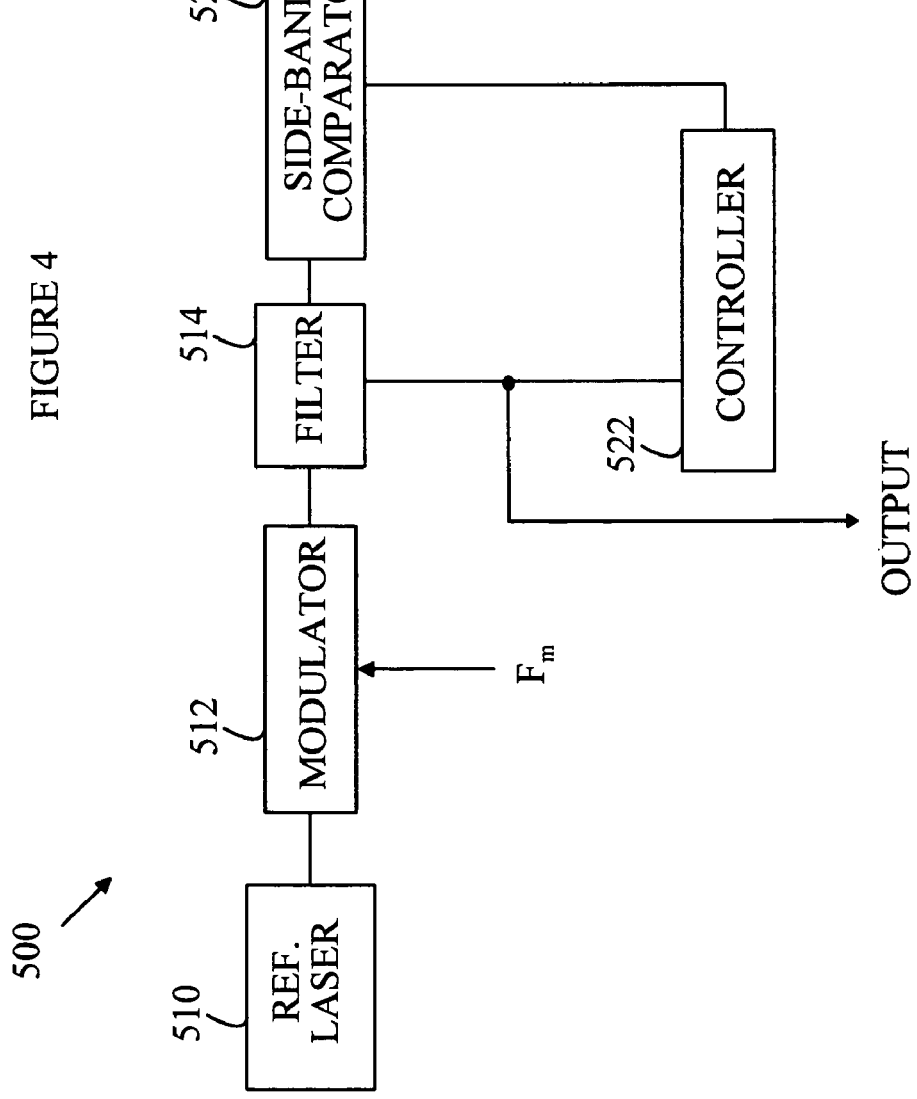
FIG. 4 illustrates another embodiment of an accelerometer according to the present invention.
FIG. 5 illustrates a reference signal having two side bands generated by the modulated signal from laser 510.

Refer now to FIG. 4, which illustrates another embodiment of an accelerometer according to the present invention. Accelerometer 500 also uses a laser having an output $\lambda_{ref}$ to maintain the filter at a resonance wavelength of $\lambda_f$ where $n\lambda_{ref}=m\lambda_f$. Here, n and m are integers. The particular feedback loop used in accelerometer 500 operates by using modulator 512 to modulate the signal from laser 510 at a frequency $F_m$ to generate a reference signal having two side bands 515 and 517 spaced about $\lambda_{ref}$ by $F_m$ as shown in FIG. 5. If the resonance frequency of the Fabry-Perot filter is shifted slightly, the side bands will be attenuated differently. A side-band comparison circuit 520 operates on the light leaving filter 514. The output of circuit 520 is utilized by controller 522 to adjust the control voltage applied between the fixed and moveable mirrors. The control voltage, or a signal related thereto, provides an output signal that is a measure of the acceleration to which filter 517 was subjected.

Since the sideband measurements do not require that the mirror spacing be altered during the measurement process, the frequency response of the servo system is not limited by the speed with which the mirror position can be altered. In addition, the mirror spacing is only altered when it is changed by the acceleration to which the device is subjected. Hence, there is no control voltage dither signal imposed on the output signal.

This embodiment of the present invention has the advantage of not dithering the control voltage, and hence, avoids problems associated with the measurement signal used to adjust the servo loop altering the distance between the mirrors.

Figure 6:
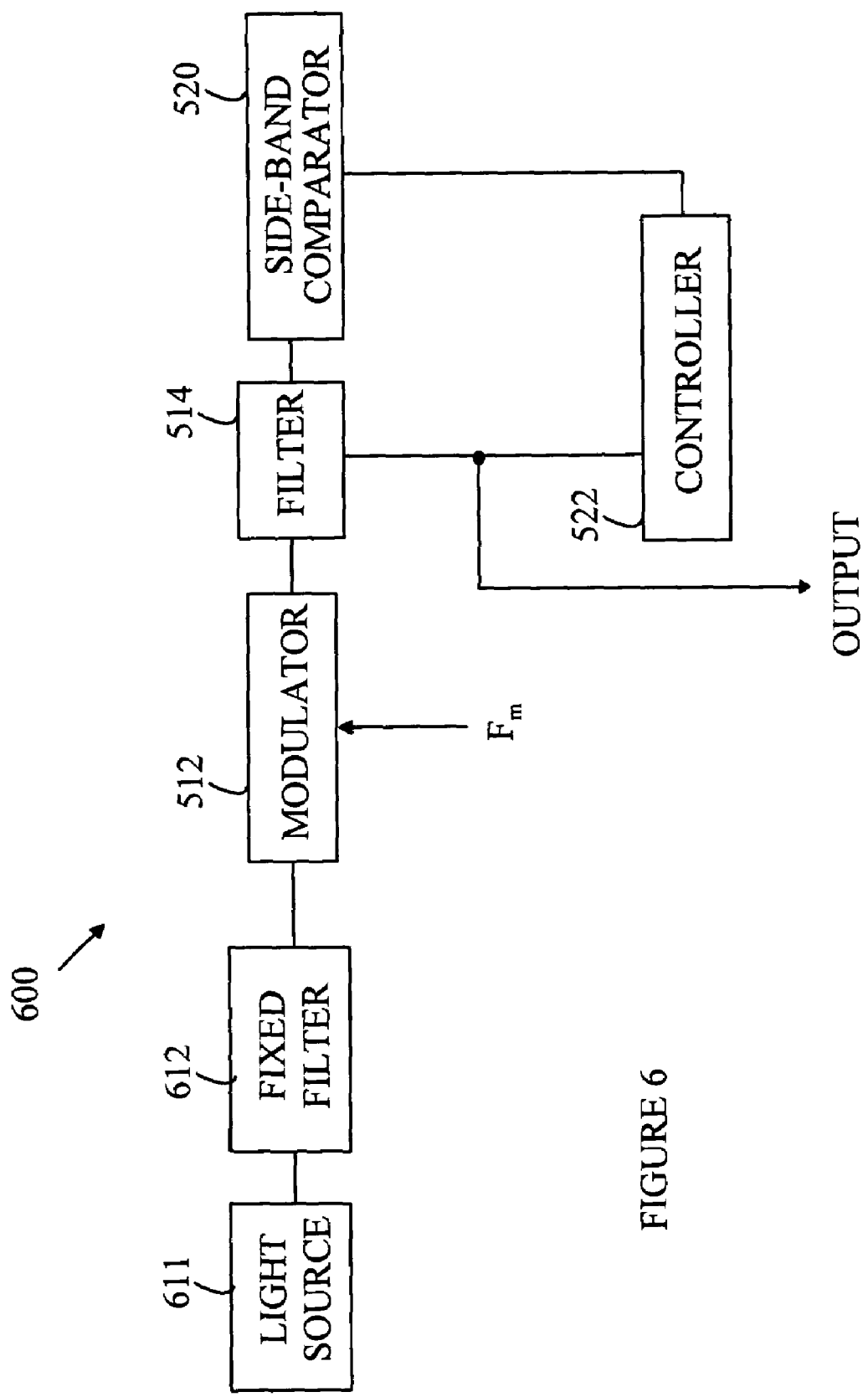
FIG. 6 illustrates an embodiment of the present invention that utilizes a broadband-light source and a filter.

The above-described embodiments of the present invention utilize a laser as the reference source. However, other light sources can be utilized. For example, a narrow line source can be provided by using a broad line source such as an LED whose output light is filtered through a Fabry-Perot filter having fixed mirrors. An embodiment of the present invention that utilizes a broadband-light source and a filter is shown in FIG. 6. To simplify the following discussion, those elements of accelerometer 600 which serve functions analogous to those described above with reference to FIG. 5 have been given the same numeric definitions and will not be discussed in more detail here. In accelerometer 600, the laser light source described above has been replaced by an LED 611 whose output light is filtered through a Fabry-Perot filter 612 having mirrors that are rigidly fixed with respect to one another. The output of Fabry-Perot filter 612 is then used as the input to Fabry-Perot filter 514. Controller 522 maintains the distance between the mirrors of Fabry-Perot filter 514 such that the resonant wavelength of the cavity matches the input wavelength of the light leaving filter 612. It should be noted that filter 612 can be a single Fabry-Perot filter or a cascade of filters having different resonant wavelengths.

The above embodiments of the present invention have been described in terms of an accelerometer. However, the present invention can be utilized in a number of other applications. For example, the present invention can be utilized as an acoustic sensor for measuring sound waves.

Figure 7:
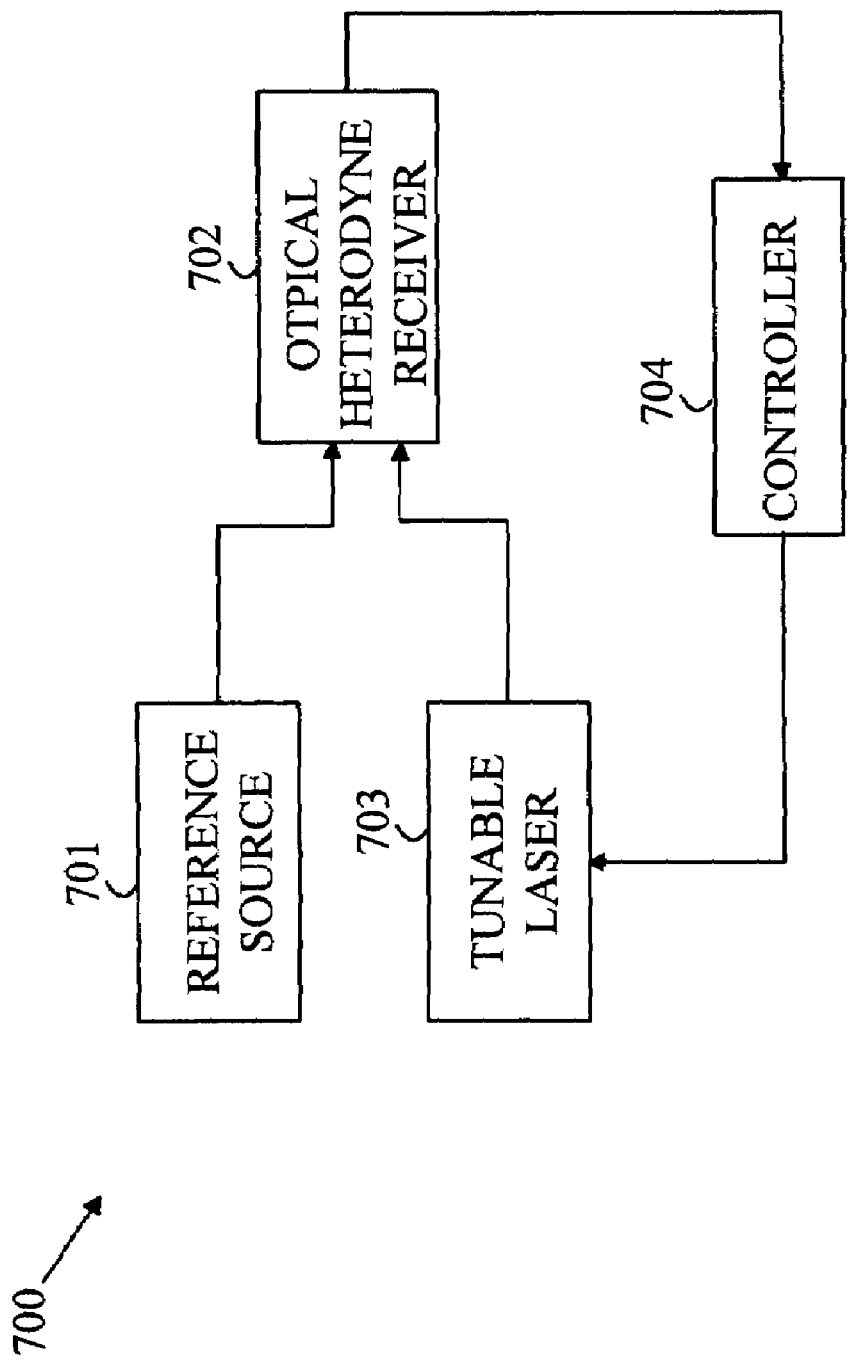
FIG. 7 is a block diagram of a sensor according to another embodiment of the present invention.

The embodiments of the present invention discussed above utilize a Fabry-Perot filter that is tuned to maintain its resonant wavelength at a predetermined value set by a reference light source. However, embodiments based on a tunable laser can also be constructed. Refer now to FIG. 7, which is a block diagram of a sensor according to another embodiment of the present invention. Sensor 700 utilizes a tunable laser 703 based on a Fabry-Perot resonator. The distance between the mirrors is adjusted to maintain the output wavelength of the laser at the same wavelength as that of a reference light source 701. Reference light source 701 is preferably a laser having a fixed wavelength that is independent of any mechanical forces to which it is subjected.

The wavelengths of the tunable laser and the reference laser are compared in an optical heterodyne receiver 702. Since such receivers are well known in the optical arts, receiver 702 will not be discussed in detail here. For the purposes of the present discussion, it is sufficient to note that receiver 702 generates an electrical signal having a frequency that is related to the difference in frequencies of the two light sources. Hence, the output signal is a very sensitive measure of the difference in wavelengths of the two optical signals. Controller 704 uses this signal to set the distance between the two mirrors in the tunable laser.

The coupling of the optical signal from the Fabry-Perot resonator to the external measuring device can be accomplished with external optics that focus the light leaving the resonator on the input to the measuring device. In some cases, the input is actually an optical fiber. Alternatively, a fiber can be connected directly to the fixed mirror of the resonator.

Various modifications to the present invention will become apparent to those skilled in the art from the foregoing description and accompanying drawings. Accordingly, the present invention is to be limited solely by the scope of the following claims.

What is claimed is:

1. A sensor comprising
  an optical cavity defined by first and second minors having a spacing there between that varies in response to a force applied to said sensor and to a control voltage;
  an output port that outputs light from said optical cavity; and
  a drive circuit that measures light leaving said output port and applies said control voltage to said optical cavity such that said spacing between said mirrors remains at a predetermined value independent of said force, said control voltage determining an output signal that represents said force as a function of time.

2. The sensor of claim 1 wherein said first mirror is fixed to said second minor by a spring mechanism that causes said first minor to move away from said second mirror and wherein said control voltage causes said first minor to move toward said second minor.

3. The sensor of claim 1 wherein said sensor comprises a reference light source that generates a reference light signal of a first reference wavelength.

4. A sensor comprising
an optical cavity defined by first and second mirrors having a spacing there between that varies in response to a force applied to said sensor and to a control voltage;
an output port that outputs light from said optical cavity; and
a drive circuit that measures light leaving said output part and applies said control voltage to said optical cavity such that said spacing between said mirrors remains at a predetermined value independent of said force, said control voltage determining an output signal,
wherein said sensor comprises a reference light source that generates a reference light signal of a first reference wavelength, and
wherein said reference light source comprises a laser.

5. A sensor comprising
an optical cavity defined by first and second minors having a spacing there between that varies in response to a force applied to said sensor and to a control voltage;
an output port that outputs light from said optical cavity; and
a drive circuit that measures light leaving said output port and applies said control voltage to said optical cavity such that said spacing between said mirrors remains at a predetermined value independent of said force, said control voltage determining an output signal,
wherein said sensor comprises a reference light source that generates a reference light signal of a first reference wavelength, and
wherein said reference light source comprises a light source that generates in a predetermined band of wavelengths and a filter for filtering said light to provide light in a narrower band of wavelengths that includes said first reference wavelength.

6. The sensor of claim 5 wherein said filter comprises a Fabry-Perot filter.

7. The sensor of claim 3 wherein said reference light signal is input to said optical cavity through an input port in said cavity.

8. A sensor comprising
an optical cavity defined by first and second mirrors having a spacing there between that varies in response to a force applied to said sensor and to a control voltage;
an output port that outputs light from said optical cavity; and
a drive circuit that measures light leaving said output port and applies said control voltage to said optical cavity such that said spacing between said minors remains at a predetermined value independent of said force, said control voltage determining an output signal; and
wherein said sensor comprises a reference light source that generates a reference light signal of a first reference wavelength; and wherein said reference light signal is input to said optical cavity through an input port in said cavity; and
wherein said reference light signal further comprises light of a second reference wavelength and a third reference wavelength and wherein said drive circuit comprises a detector that measures the relative intensities of light of said second and third reference wavelengths that leaves said output port.

9. A sensor comprising
an optical cavity defined by first and second mirrors having a spacing there between that varies in response to a force applied to said sensor and to a control voltage;
an output port that outputs light from said optical cavity; and
a drive circuit that measures light leaving said output port and applies said control voltage to said optical cavity such that said spacing between said mirrors remains at a predetermined value independent of said force, said control voltage determining an output signal,
wherein said optical cavity comprises an optical gain material that generates light of a wavelength equal to a resonant wavelength of said optical cavity.

10. A sensor comprising
an optical cavity defined by first and second mirrors having a spacing there between that varies in response to a force applied to said sensor and to a control voltage;
an output port that outputs light from said optical cavity; and
a drive circuit that measures light leaving said output port and applies said control voltage to said optical cavity such that said spacing between said mirrors remains at a predetermined value independent of said force, said control voltage determining an output signal; and
wherein said optical cavity comprises an optical gain material that generates light of a wavelength equal to a resonant wavelength of said optical cavity.
wherein said drive circuit measures a quantity related to the difference in wavelength between said reference light signal and said light leaving said output port.

11. A method for sensing the magnitude of a force, said method comprising
subjecting an optical cavity defined by first and second mirrors having a spacing there between that varies in response to said force and to a control voltage to said force;
measuring a resonant wavelength of said cavity by detecting light leaving said cavity;
applying said control voltage to said optical cavity to maintain said spacing between said mirrors at a predetermined value independent of said force,
and outputting a signal determined by said control voltage that represents said force as a function of time.

12. The method of claim 11 wherein said resonant wavelength of said cavity is determined by comparing light leaving said cavity with light of a reference wavelength.

13. The method of claim 11 wherein said resonant wavelength of said cavity is determined by Filtering a light signal of a reference wavelength with said cavity to form a filtered light signal having an amplitude, and measuring the amplitude.

14. The method of claim 13 further comprising generating said reference light signal by a laser.

15. The method of claim 14 further comprising modulating said reference light signal prior to being filtered by said cavity.

16. The method of claim 15 wherein said resonant wavelength of said cavity is maintained by measuring sidebands introduced into said reference light signal by said modulation.

17. The method of claim 11 further comprising generating light in said cavity.

* * * * *

UNITED STATES PATENT AND TRADEMARK OFFICE
CERTIFICATE OF CORRECTION

PATENT NO. : 7,180,605 B2
APPLICATION NO. : 10/952091
DATED : February 20, 2007
INVENTOR(S) : Dan Huber It is certified that error appears in the above-identified patent and that said Letters Patent is hereby corrected as shown below:

Col. 6 line 58, delete "minors" and insert -- mirrors --, therefor.

Col. 7 line 4, delete "minor" and insert -- mirror --, therefor.

Col. 7 line 5, delete "minor" and insert -- mirror --, therefor.

Col. 7 line 6, delete "minor" and insert -- mirror --, therefor.

Col. 7 line 7, delete "minor." and insert -- mirror. --, therefor.

Col. 7 line 18, delete "part" and insert -- port --, therefor.

Col. 7 line 28, delete "minors" and insert -- mirrors --, therefor.

Col. 7 line 62, delete "minors" and insert -- mirrors --, therefor.

UNITED STATES PATENT AND TRADEMARK OFFICE
CERTIFICATE OF CORRECTION

PATENT NO. : 7,180,605 B2
APPLICATION NO. : 10/952091
DATED : February 20, 2007
INVENTOR(S) : Dan Huber It is certified that error appears in the above-identified patent and that said Letters Patent is hereby corrected as shown below:

Col. 8 line 38, delete "cavity." and insert -- cavity, --, therefor.

Col. 8 line 59, delete "Filtering" and insert -- filtering --, therefor.

Signed and Sealed this

Fifth Day of August, 2008

JON W. DUDAS
*Director of the United States Patent and Trademark Office*